April 20, 1943.  W. E. BOWLING  2,317,127
PICK-UP ATTACHMENT FOR HARVESTER-THRESHERS
Filed Aug. 7, 1941  4 Sheets-Sheet 2

INVENTOR.
Warren E. Bowling
BY
ATTORNEY.

April 20, 1943.   W. E. BOWLING   2,317,127
PICK-UP ATTACHMENT FOR HARVESTER-THRESHERS
Filed Aug. 7, 1941   4 Sheets-Sheet 3

INVENTOR.
Warren E. Bowling
BY
ATTORNEY.

April 20, 1943.  W. E. BOWLING  2,317,127
PICK-UP ATTACHMENT FOR HARVESTER-THRESHERS
Filed Aug. 7, 1941  4 Sheets-Sheet 4
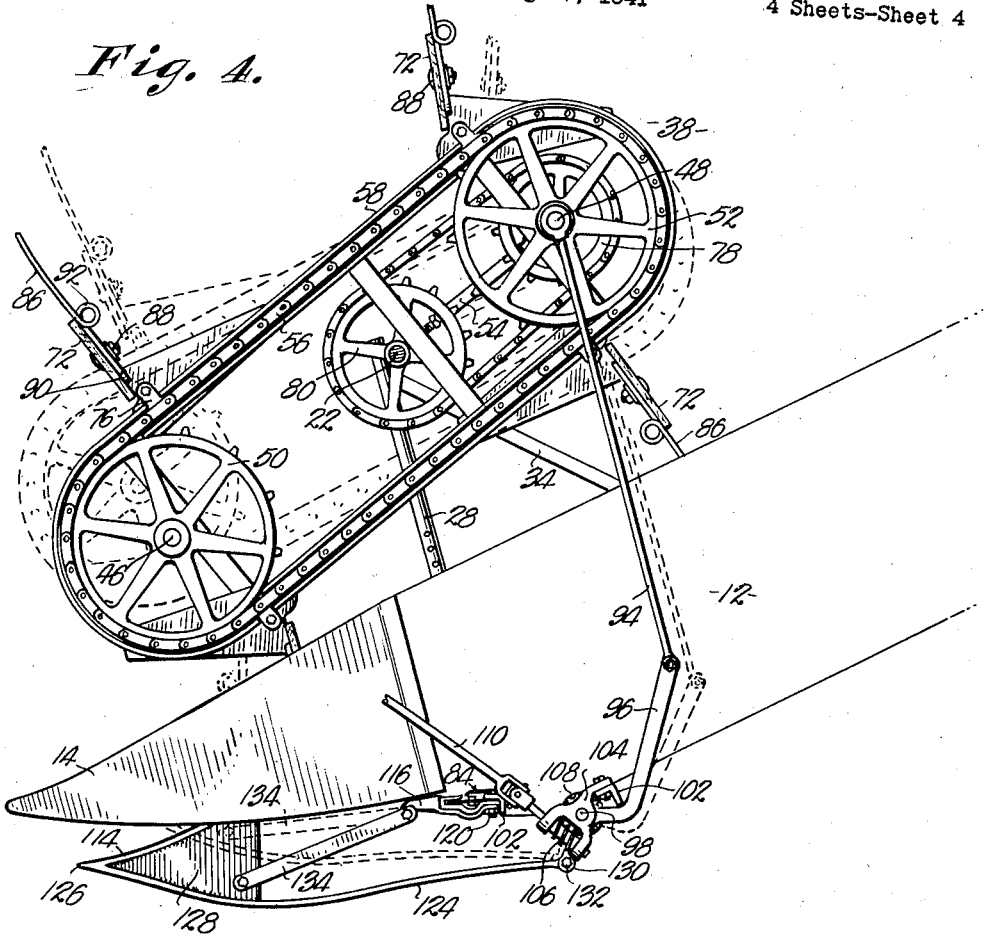
Fig. 4.
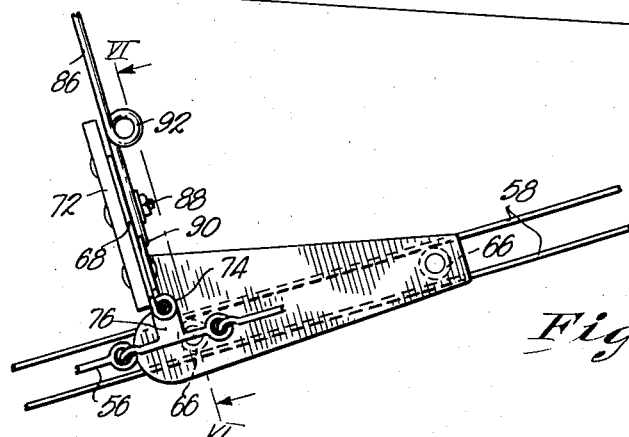
Fig. 5.
INVENTOR.
Warren E. Bowling
BY
ATTORNEY.

Patented Apr. 20, 1943

2,317,127

UNITED STATES PATENT OFFICE 2,317,127

PICKUP ATTACHMENT FOR HARVESTER-THRESHERS

Warren E. Bowling, Gardner, Kans.

Application August 7, 1941, Serial No. 405,804

7 Claims. (Cl. 56—219)

This invention relates to implements for harvesting grains, grasses and other similar plants, and has for its primary object the provision of a pick-up attachment, combinable with harvesters and harvester threshers of the type now commercially prevalent.

One of the important aims of this invention is the provision of a pick-up attachment for harvester threshers, the character whereof insures a full and complete cutting of all of the crop and the avoidance of loss due to the crop being in any position other than fully standing.

This invention has for other objects to provide an inexpensive, effective and easily attachable pick-up means; to provide novel, unique and effective lifters for grain that has lodged or bent toward the ground, where the same would not normally be cut by the sickle assembly; to provide unique pusher structure, attachable to conventional harvester threshers in the place of the well-known reel thereof; to provide specially disposed teeth on the aforesaid pusher structure, that travel through paths between and intersecting parts of the aforesaid lifters; to provide means for raising and lowering both the specially designed lifters and said pusher structure and to include in the said lifters and pusher structure, parts permitting attachment to the conventional harvesting machine, without re-arranging any of the factory-made parts of such machine, and without the employment of special tools at the point of application.

The particular form and manner of associating lifters with the sickle assembly and the way of building and mounting the pusher structure, constitute minor objects of the invention, which will appear during the course of the following specification, referring to the accompanying drawings, wherein:

Fig. 4 is a similar view, illustrating the pick-up attachment and parts thereof in two separate positions and with the conveyor elevated from that position shown in Fig. 3, to indicate that said conveyor is separately movable with respect to the pick-up attachment.

Fig. 5 is an enlarged fragmentary detailed sectional view illustrating the manner of affixing the slats to the endless chains of the pusher structure.

Harvester threshers of the well-known type and now in commercial use, have a decided shortcoming in that fallen, or grain that is not standing normally, is left in the field after the harvester has passed thereover and cut such grain as is erect enough to be clipped by the sickle assembly.

Figure 3:
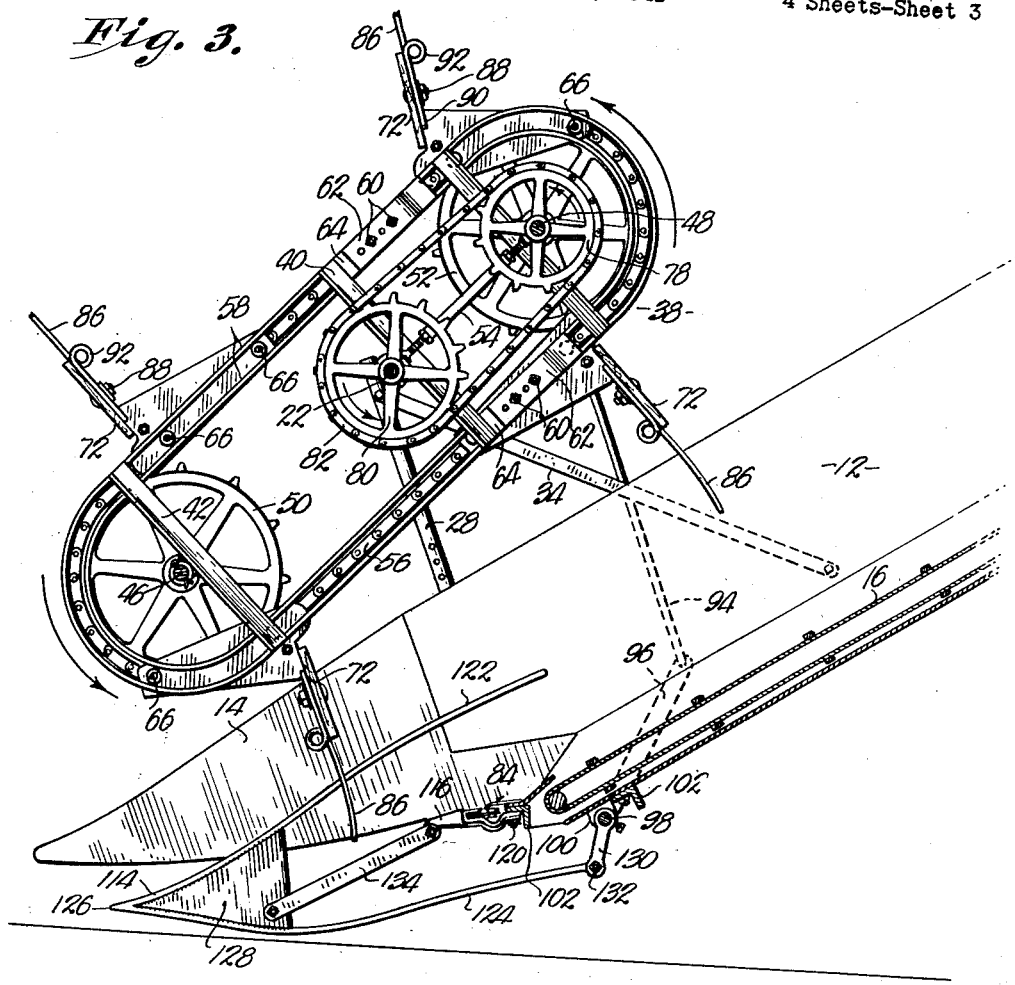
Fig. 3 is a vertical sectional view through the attachment and a portion of the harvesting machine with which it is associated, taken on line III—III of Fig. 2.

The attachment embodying the concepts of this invention may be quickly secured in place on the feeder of the harvesting machine, which in the accompanying drawings, is broadly designated by the numeral 10. This feeder comprises sides 12 which terminate in dividers 14, a conveyor belt 16, and an adjusting rack 18, manually operable by a crank shaft 20 that extends to within reach of the operator of the machine. This adjustable rack 18 and shaft 20 are used to elevate the entire feeder 10 from a position shown in Fig. 3, to a position shown in Fig. 4, for example. When such elevation occurs, the entire attachment travels therewith for all the parts thereof are mounted upon the feeder 10 in a manner more fully hereinafter set down.

In a large number of threshing and harvesting machines now in use and on the market, a reel, not here shown, is employed for assisting the movement of the grain onto conveyor belt 16. This said reel is carried by a drive shaft 22, driven by a sprocket and chain arrangement 24, that imparts rotary movement to shaft 22 from any source of power. This drive shaft 22 is journalled at its one end in a bearing 26 mounted on the upper end of tubular section 28 of a support, the rod 30 of which is joined to side wall 12 of conveyor 10. The length of this support comprises parts 28 and 30 that may be increased by withdrawing lock bolt 32 from registering holes in sections 28 and 30, and rearranging the said parts for the purpose just mentioned. A brace 34 is fastened at one end to conveyor 10 and at the other end to the upper portion of section 28 of the support to lend rigidity. These parts 28, 30 and 34 which support bearing 26, are added to the conventional reel shaft 22 to accommodate the additional weight imposed thereon through the attachment thereto of the pusher structure.

Shaft 22 and its reel is normally carried by reel post 36 near one end only of shaft 22.

Figure 1:
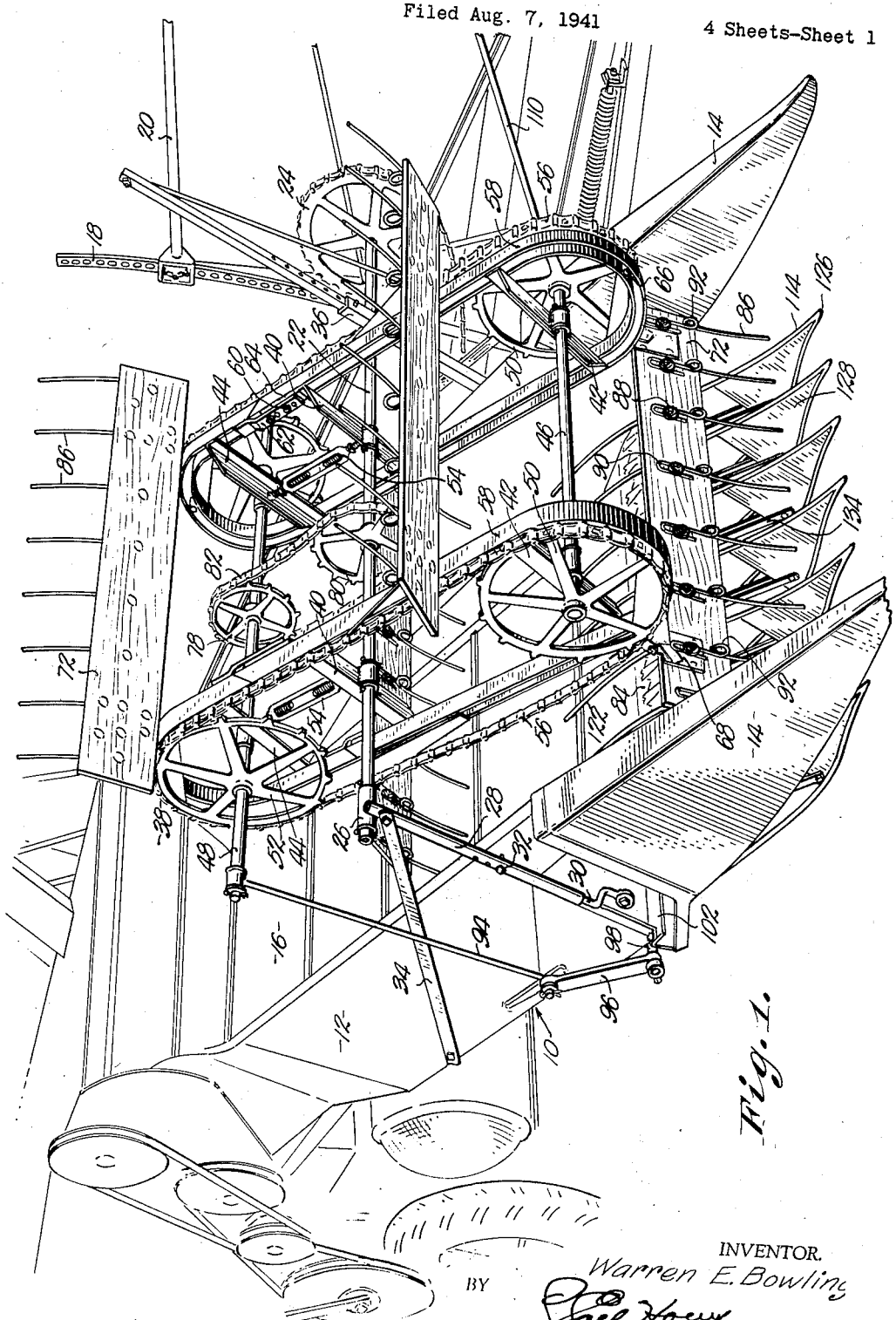
Fig. 1 is a perspective view of a pick-up attachment for harvester threshers made in accordance with the present invention and showing the same in operative position.
Figure 2:
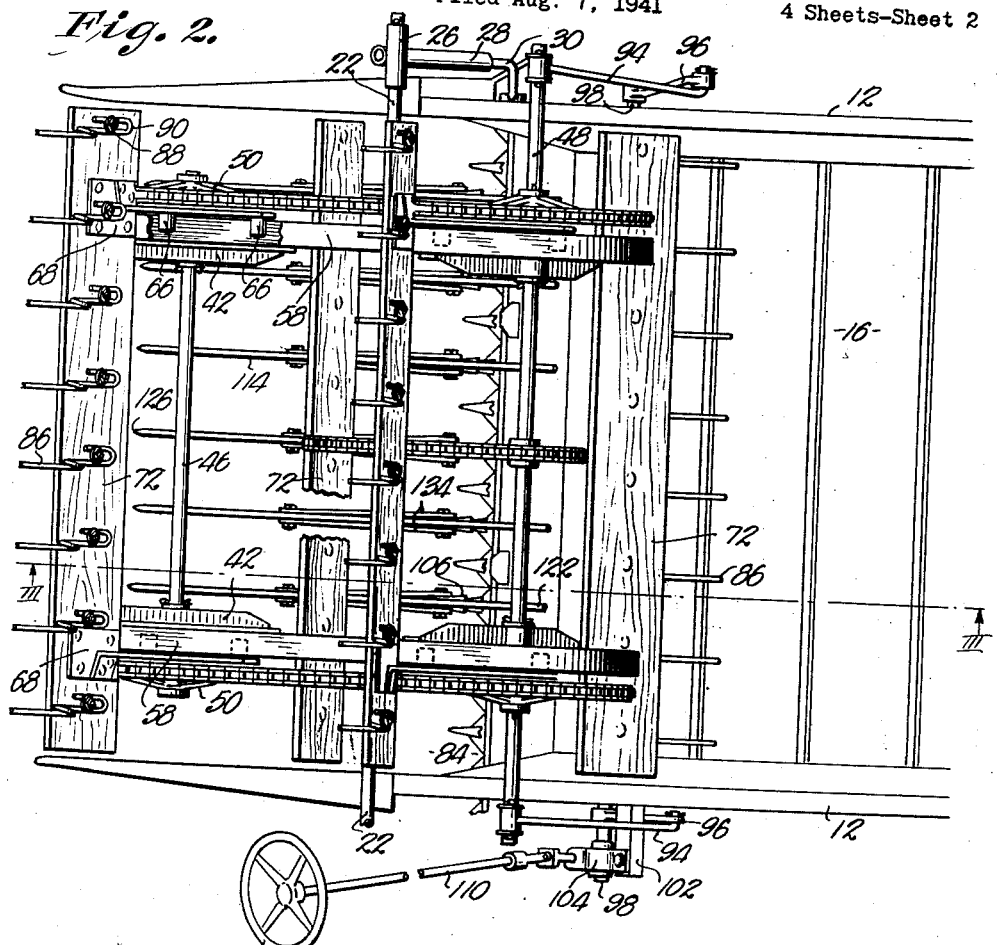
Fig. 2 is a top plan view of the attachment.
Figure 6:
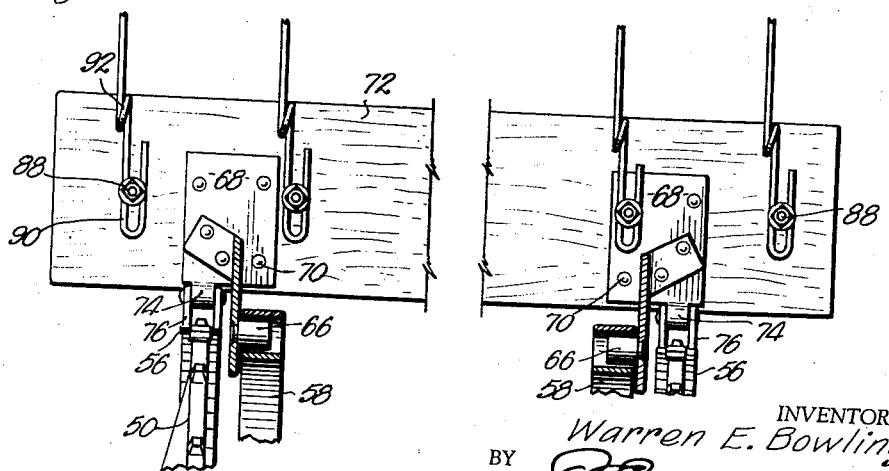
Fig. 6 is a fragmentary detailed sectional view taken on line VI—VI of Fig. 5.

The pusher structure, broadly designated by the numeral 38, is best shown in Fig. 1, and comprises brackets 40 having integral bearings journalling shaft 22. These brackets 40 have companion brackets 42 and 44 respectively, journalling shafts 46 and 48 whereupon are mounted sprockets 50 and 52 respectively.

Brackets 44 are joined to brackets 40 by turnbuckles 54 to adjust the tension of chains 56 passing over opposed sprockets 50 and 52.

Chains 56 ride in specially formed guides 58 that are sectional in character and mounted upon brackets 40, 42 and 44. One section of each guide 58 is mounted upon brackets 40 and 42, while the other section thereof is carried by bracket 44.

The abutting ends of sections of each guide 58 are inclined as illustrated in Fig. 1, to insure an overlapping relation when adjustment occurs.

When turnbuckles 54 are manipulated, bolts 60, that normally secure together the ends of the sections of guides 58, are removed. One section of each guide has a finger 62 overlapping a plate 64 on the other section and after bolts 60 are removed and turnbuckles 54 are manipulated to adjust the tension of chains 56, bolts 60 are replaced to insure rigidity.

The portion of chains 56 that ride in guides 58 are in the nature of rollers 66 carried by each fixture 68, bolted or otherwise secured as at 70 to each slat 72 respectively. As indicated in the drawings, there are two fixtures 68 on each slat 72 and these slats intersect chains 56 and bridge the space therebetween.

Each fixture 68 has a loop 74 integral therewith that enters between a pair of ears 76, rigid with a link of the proximal chain 56. Each fixture 68 has a portion thereof extending longitudinally along beside the chain to which it is secured, and this plate portion rides beside the proximal guide 58.

Shafts 46 and 48 are parallel with drive shaft 22 and the latter is driven thereby through the medium of sprockets 78 and 80 joined by drive chain 82—thus the slats of pusher structure 38 are carried through endless paths of travel above conveyor belt 16 and above the hereinafter described lifters, which cooperate with the sickle assembly, broadly designated by the numeral 84.

Each slat 72 has a number of resilient teeth 86 fastened thereto through the medium of bolts 88 to extend laterally therefrom in substantially the same major plane thereas. Each tooth 86 has a U-shaped portion 90 formed thereon to engage its bolt 88 and to permit adjustment to increase or decrease the length of the tooth which extends beyond the edge of the slat 72. Each tooth 86 is fashioned of resilient material, preferably rod-shaped in character and has a loop 92 formed therein to further increase the resiliency and ability of the tooth to flex when necessary.

Pusher structure 38 is rockably mounted on shaft 22 through the medium of the aforesaid bearings or brackets 40 and is held in the desired position by a rod 94 and arm 96, one of which is at each end of shaft 48 to join the same with operating shaft 98 journalled in bearings 100, carried by a portion of the feeder 10. This shaft 98 extends transversely of conveyor belt 16 and therebelow, adjacent to an angle iron 102, which forms a part of the feeder assembly 10.

A yoke 104 secured to angle iron 102 carries worm 106 in mesh with pinion 108 on shaft 98. This worm is connected to column 110 that extends to within reach of the operator of the machine where wheel 112 is used to rotate column 110 and thereby turn shaft 98 about its axis to raise and lower the rear end of pusher structure 38 through the medium of arms 96 and rods 94.

The rocking movement thus imparted to the pusher structure, is about the axis of shaft 22 and when shaft 48 is raised, the portion of the pusher structure 38 forwardly of shaft 22, is lowered to move teeth 86 closed to the ground and also the sickle assembly 84.

Obviously, an understanding of the rigging for rocking pusher structure 38 will teach one skilled in the art that said structure 38 is rockable independently of the movement of feeder 10.

Figure 7:
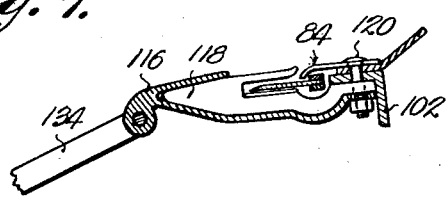
Fig. 7 is a fragmentary sectional view through the sickle assembly, illustrating the manner of attaching the lifters thereto.

The series of lifters, each designated by the numeral 114, is carried by sickle assembly 84 through the medium of shoes 116, one of which is associated with each lifter 114. As illustrated in Fig. 7, each shoe 116 has a socket into which fits a toe 118 of the cutter guard of the sickle assembly. A bolt 120 passing through the heel of the cutter guard completes the attachment of the shoe and affords sufficient rigidity to withstand any force that may be applied to the forward ends of the respective lifters 114.

Each lifter is in the nature of a V-shaped body having an upper and a lower leg 122 and 124 respectively, which meet in a point 126 and that lie above and below respectively, sickle assembly 84. These legs 122 and 124 are resilient to a slight degree and are formed of attenuated material joined by a plate 128 near the point of the V-shaped body.

The upper leg 122 in concave near the point of the body, while the lower leg 124 is convex, or bulges outwardly along a stretch thereof, past rearwardly from point 126. Upper leg 122 extends rearwardly past sickle assembly 84 to a point above conveyor belt 116 and lower leg 128 has its rear free end below sickle assembly and conveyor belt 84 and 16 respectively, where it is joined to operating shaft 98 through a link 130. This link 130 is rigid to shaft 98 and leg 124 is pivotally attached to the free end thereof as at 132.

Another link 134 interconnects plate 128 with shoe 116. The connections between plate 128 and shoe 116 are pivotal in nature to permit movement of the lifters as shaft 93 is rotated.

It is obvious that upon rotation of shaft 98 by parts 106, 108, 110 and 112, all of the V-shaped lifters will have their outer, pointed free ends raised above the surface of the ground, for example, from the position shown in full lines of Fig. 4, to the position shown in dotted lines thereof. When in the lowermost position, all of the parts moved by shaft 98 are held by the engagement of arms 96 with angle iron 102, which serves as a definite stop.

Teeth 86 of the pusher structure 38, holds travel through path intersecting the sickle assembly 84 and between upper arms 122 of the V-shaped lifters.

The most effective results are obtained when teeth 86 are well between upper legs 122 as said teeth move along above sickle assembly 84. With a such a relation of parts, the stalks of grain, grasses or the crop being cut, are definitely lifted to a point above the level of sickle assembly 84, even though the stalks had previously been lying close to the surface of the earth. Points 126 will slide beneath the bent-over stalks to lift the same, whereupon teeth 86 will insure that the upper part of the stalks are raised and slid along leg 122.

In actual practice, fields of grain that have been bent to the earth by heavy rains and winds have been cut successfully with an attachment of the character above described and shown in the accompanying drawings. This equipment has been used where a conventional implement has failed and even where the manufacturers of harvesting threshing machines have attempted to add to their implements, lifters intended to overcome the difficulty.

The broad concepts of the invention have been made clear throughout the foregoing specification, and while the preferred form of the invention has been illustrated and described, it is understood that many changes and modifications might be made without departing from the scope of the appended claims.

Having thus described the invention, what is claimed as new and desired to be secured by Letters Patent is:

1. In a harvesting machine of the character described having a sickle assembly and a conveying means along one side thereof, the combination of a plurality of V-shaped lifters along the opposite side of the sickle assembly with the legs thereof in straddling relation with the sickle assembly and spaced an appreciable distance therefrom; a plurality of links joining the lifters with the sickle assembly; and manually operable means for shifting the lifters with respect to the sickle assembly, said means for shifting the lifters comprising a shaft common to all the lifters, a link connecting the shaft with one leg of each lifter respectively, and means for rotating the shaft about its axis to rock the first mentioned links and shift the lifters, said first mentioned links being pivotally joined to the sickle assembly.

2. In a harvesting machine of the character described having a sickle assembly and a conveying means along one side thereof, the combination of a plurality of V-shaped lifters along the opposite side of the sickle assembly with the legs thereof in straddling relation with the sickle assembly and spaced an appreciable distance therefrom; a plurality of links joining the lifters with the sickle assembly; and manually operable means for shifting the lifters with respect to the sickle assembly, said means for shifting the lifters comprising a shaft common to all the lifters, a link connecting the shaft with one leg of each lifter respectively, and means for rotating the shaft about its axis to rock the first mentioned links and shift the lifters, the other leg of each lifter having its free end above and extended to the first mentioned side of the sickle.

3. In a harvesting machine of the character described having a sickle assembly and a conveying means along one side thereof, the combination of a plurality of V-shaped lifters along the opposite side of the sickle assembly with the legs thereof in straddling relation above and below respectively the said sickle assembly; and a pusher structure mounted above the sickle assembly and lifters, said pusher structure and lifters having common manipulative means for raising and lowering the same with respect to the sickle assembly.

4. In a harvesting machine of the character described having a sickle assembly and a conveying means along one side thereof, the combination of a plurality of V-shaped lifters along the opposite side of the sickle assembly with the legs thereof in straddling relation above and below respectively the said sickle assembly and a pusher structure mounted above the sickle assembly and lifters; said pusher structure comprising a plurality of endless chains, slats mounted on the chains for movement through a path of travel transversely across and above the sickle assembly and the lifters, and teeth on the slats projecting between the upper legs of the lifters to draw the uncut plants upwardly and toward the sickle assembly, said pusher structure and lifters having common manipulative means for raising and lowering the same with respect to the sickle assembly.

5. In a harvesting machine of the character described having a sickle assembly and a conveying means along one side thereof, the combination of a plurality of V-shaped lifters along the opposite side of the sickle assembly with the legs thereof in straddling relation above and below respectively the said sickle assembly and a pusher structure mounted above the sickle assembly and lifters, said pusher structure comprising a plurality of endless chains, slats mounted on the chains for movement across and above the sickle assembly and the lifters, teeth on the slats projecting between the upper legs of the lifters to draw the uncut plants upwardly and toward the sickle assembly, said pusher structure being rockably mounted to move the forward end thereof toward and from the lifters as the pusher is in operation, and common means for rocking said pusher structure and for raising and lowering the lifters with respect to the sickle assembly.

6. In a harvesting machine of the character described having a sickle assembly and conveying means along one side thereof, the combination of a plurality of V-shaped lifters along the opposite side of the sickle assembly with the legs thereof in straddling relation above and below respectively the said sickle assembly; said pusher structure comprising a plurality of endless chains, slats mounted on the chains for movement through a path of travel transversely across and above the sickle assembly and the lifters, teeth on the slats projecting between the upper legs of the lifters to draw the uncut plants upwardly and toward the sickle assembly, said endless chains of the pusher structure being operatively connected to a drive shaft forming a part of the harvesting machine, said drive shaft being disposed between the ends of said chains, and rockably carrying the entire pusher structure, and means for simultaneously rocking the pusher structure on said drive shaft and for raising and lowering said lifters with respect to the sickle assembly.

7. In a harvesting machine of the character described having a sickle assembly and a conveying means along one side thereof, a plurality of V-shaped lifters along the opposite side of the sickle assembly with the legs thereof in straddling relation with the sickle assembly, a pusher structure rockably mounted above the sickle assembly and lifters, a plurality of links joining the lifters with the sickle assembly, and common means for raising and lowering said lifters and for rocking the pusher structure with respect to the sickle assembly, said means comprising a shaft, a link connecting the shaft with one leg of each lifter respectively, an arm on said shaft, a rod connecting said arm with the pusher structure, and means for rotating the shaft about its axis.

WARREN E. BOWLING.